United States Patent
Cheng et al.

(10) Patent No.: US 7,667,689 B2
(45) Date of Patent: Feb. 23, 2010

(54) MOUSE DEVICE WITH MECHANISM TO SWITCH MODE FOR ROLLER OPERATION

(75) Inventors: Yu-Chih Cheng, Taipei (TW); Cheng-Wen Wang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 567 days.

(21) Appl. No.: 11/673,408

(22) Filed: Feb. 9, 2007

(65) Prior Publication Data

US 2008/0165128 A1 Jul. 10, 2008

(30) Foreign Application Priority Data

Jan. 5, 2007 (TW) .............. 96100426 A

(51) Int. Cl.
G09G 3/36 (2006.01)
(52) U.S. Cl. ............................. 345/163
(58) Field of Classification Search ............. 345/163, 345/166, 158, 173, 184
See application file for complete search history.

(56) References Cited

U.S. PATENT DOCUMENTS

| 5,912,661 | A * | 6/1999 | Siddiqui | 345/166 |
| 6,459,421 | B1 * | 10/2002 | Cho et al. | 345/166 |
| 2007/0132731 | A1 * | 6/2007 | Lin et al. | 345/163 |
| 2007/0222751 | A1 * | 9/2007 | Machida | 345/163 |

\* cited by examiner

*Primary Examiner*—Chanh Nguyen
*Assistant Examiner*—Tsegaye Seyoum
(74) *Attorney, Agent, or Firm*—Kirton & McConkie; Evan R. Witt

(57) ABSTRACT

A mouse device includes a mouse main body, a roller, a rolling shaft and a switching mechanism. The roller is disposed within the mouse main body and partially protruded from the mouse main body. The rolling shaft is sheathed by the roller and has plural saw-toothed structures on the periphery thereof. The witching mechanism includes a metallic piece stand a first resilient element, a metallic piece, an indentation, a push rod and a fixing hook. By means of the switching mechanism, the mouse device is operated in a clicking-feel-imparting mode or a clicking-feel-lacking mode.

6 Claims, 5 Drawing Sheets

MOUSE DEVICE WITH MECHANISM TO SWITCH MODE FOR ROLLER OPERATION

FIELD OF THE INVENTION

The present invention relates to a mouse device, and more particularly to a mouse device having a clicking feel switching mechanism for a roller.

BACKGROUND OF THE INVENTION

Due to the amazing power of computer systems, computer systems are developed to have various functions. Input devices such as mouse devices, keyboards or a trackballs have been widely employed in a computer system for cursor control. Among these input devices, the mouse devices are the most prevailing because they are very easy-to-use. Typically, by rotating a roller of the mouse device, the image shown on the display screen may be scrolled upwardly and downwardly. The rollers for use in the mouse devices are usually classified into two types, i.e. a clicking-feel-imparting type and a clicking-feel-lacking type. When the clicking-feel-imparting type roller is rotated with a user's finger, the feeling of smooth clicks is imparted to the user. Whereas, rotation of the clicking-feel-lacking type roller gives no feeling of smooth clicks.

When the clicking-feel-imparting type roller is rotated for a graduation, the image is scrolled by a specified increment. For example, when the clicking-feel-imparting type roller is rotated for a graduation, the image shown on the display screen may be scrolled by a line, several lines or a page. As a consequence, the user is obviously conscious of the scrolled images upon rotating of the roller. In contrast, rotation of the clicking-feel-lacking type roller gives no feeling of smooth clicks.

The clicking-feel-imparting type roller and the clicking-feel-lacking type roller have their respective characters. The clicking-feel-imparting type roller is feasible in some instances, and the clicking-feel-lacking type roller is feasible in some other instances. So far, the commercial available mouse devices have either the clicking-feel-imparting type rollers or the clicking-feel-lacking type rollers. That is, the existing mouse devices have no means of operating the rollers in the clicking-feel-imparting mode or the clicking-feel-lacking mode according to the user's requirement.

SUMMARY OF THE INVENTION

It is an object of the present invention to provide a mouse device having a switching mechanism of operating the rollers between a clicking-feel-imparting mode and a clicking-feel-lacking mode according to the user's requirement.

In accordance with an aspect of the present invention, there is provides a mouse device. The mouse device includes a mouse main body, a roller, a rolling shaft and a switching mechanism. The roller is disposed within the mouse main body and partially protruded from the mouse main body. The rolling shaft is sheathed by the roller and has plural saw-toothed structures on the periphery thereof. The witching mechanism is disposed within the mouse main body, and includes a metallic piece stand a first resilient element, a metallic piece, an indentation, a push rod and a fixing hook. The first resilient element is disposed beside the metallic piece stand. The metallic piece is coupled to the metallic piece stand, and has a first terminal adjacent to the saw-toothed structures and a second terminal in contact with the first resilient element. The indentation receives therein a second resilient element. The push rod includes a protrusion piece in the vicinity of the metallic piece, a tip protruded from the mouse main body, a bottom portion in contact with the second resilient element and a gliding slot formed at the bottom portion. The fixing hook has a first end embedded into the gliding slot of the push rod and a second end engaged with the indentation.

In an embodiment, the mouse device further includes a mechanical encoder beside the roller.

In an embodiment, the metallic piece comes to contact with the saw-toothed structures when the first resilient element is in a stretched state, and the metallic piece is separated from the saw-toothed structures when the first resilient element is in a compressed state.

In an embodiment, the first resilient element is in the compressed state when the protrusion piece is sustained against the metallic piece, and the first resilient element is in the stretched state when the protrusion piece is separated from the metallic piece.

In an embodiment, the protrusion piece is sustained against the metallic piece and the first end of the fixing hook is embedded into the gliding slot at a second position when the second resilient element is in the compressed state, and the protrusion piece is separated from the metallic piece and the first end of the fixing hook is embedded into the gliding slot at a first position when the second resilient element is in the stretched state.

In an embodiment, the mouse device further includes a pressing cap formed at the tip of the push rod and protruded from the mouse main body.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention relates to a mouse device having a switching mechanism of operating the rollers between a clicking-feel-imparting mode and a clicking-feel-lacking mode according to the user's requirement.

Figure 1A:
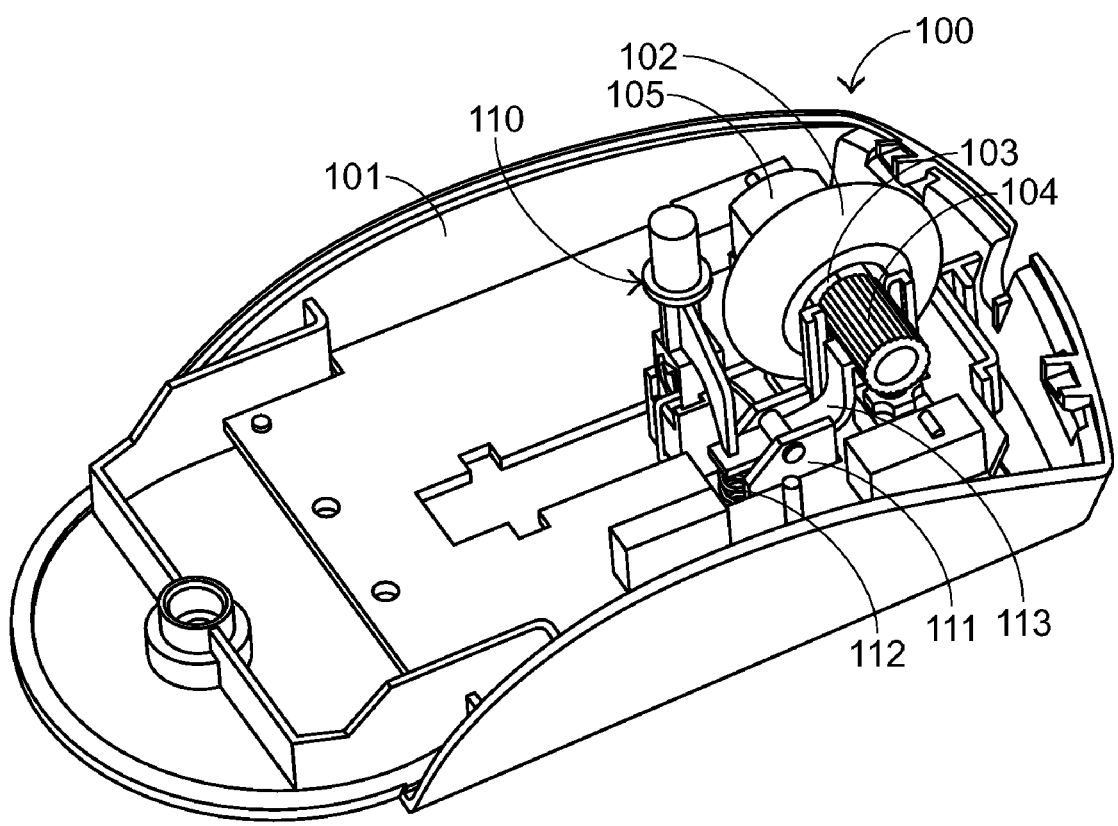
FIG. 1(a) is a schematic view illustrating the inner components of a mouse device according to a preferred embodiment of the present invention.
Figure 1B:
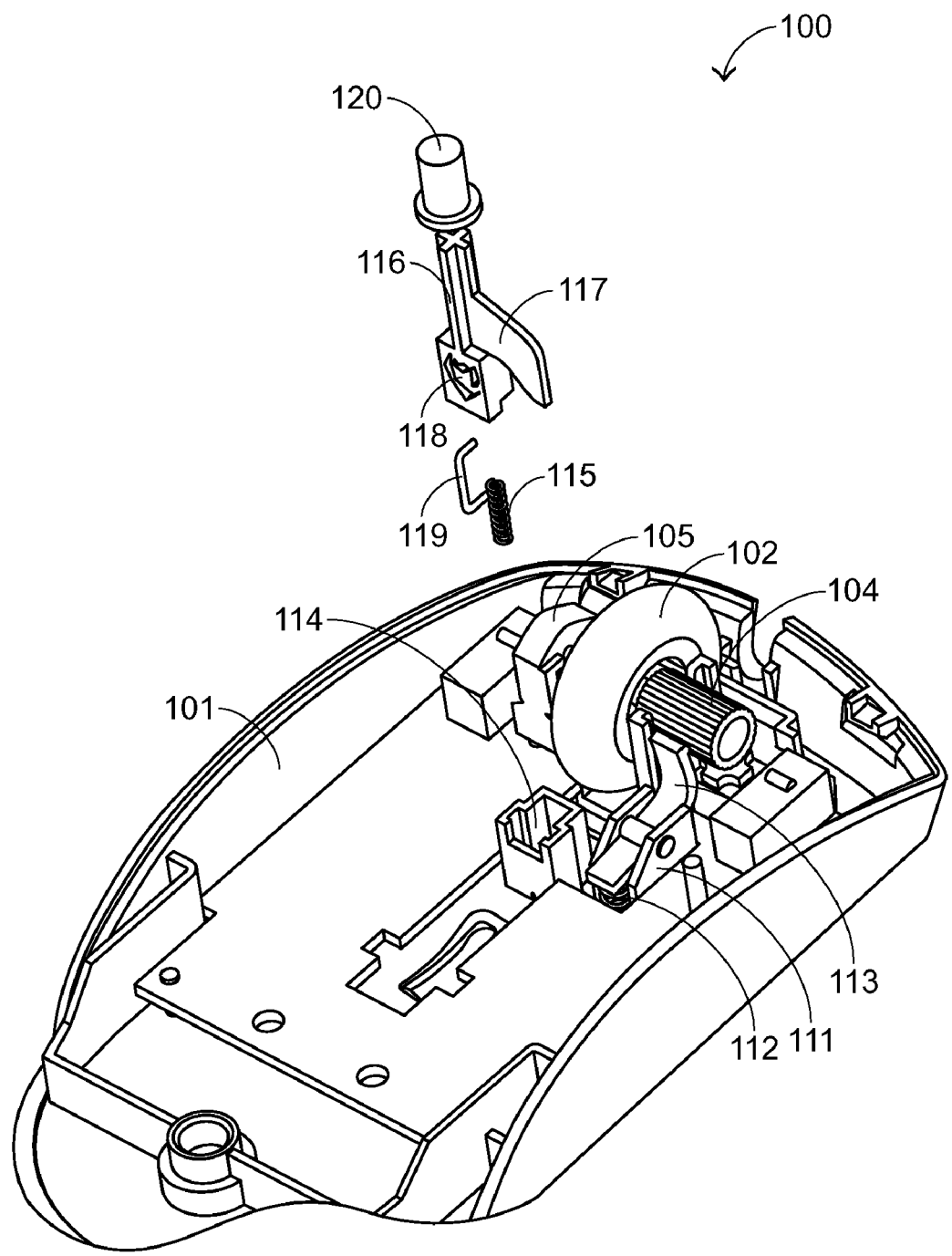
FIG. 1(b) is a schematic partial exploded view of the mouse device.

Please refer to FIG. 1(a), which is a schematic view illustrating the inner components of a mouse device according to a preferred embodiment of the present invention. FIG. 1(b) is a schematic partial exploded view of the mouse device. Please refer to FIG. 1(a) and 1(b).

The mouse device 100 of FIG. 1(a) includes a mouse main body 101, a roller 102, a mechanical encoder 105 and a switching mechanism 110. The roller 102 is sheathed around a rolling shaft 103. An end of the rolling shaft 103 has saw-toothed structures 104 on the periphery of the rolling shaft 103. In this embodiment, the saw-toothed structures 104 are discretely arranged at regular intervals around the rolling shaft 103. The switching mechanism 110 includes a metallic piece stand 111, a first resilient element 112, a metallic piece 113, an indentation 114, a second resilient element 115, a push rod 116, a fixing hook 119 and a pressing cap 120. The metallic piece stand 111 is disposed at one side of the saw-toothed structures 104 of the rolling shaft 103. The first resilient element 112 is arranged on the other side of the metallic piece stand 111. The metallic piece 113 is coupled to the metallic piece stand 111. A first terminal of the metallic piece 113 is adjacent to the saw-toothed structures 104. A second terminal of the metallic piece 113 is in contact with the first resilient element 112. The indentation 114 is disposed beside the metallic piece stand 111. The second resilient element 115 is in contact with the push rod 116 and received in the indentation 114. The push rod 116 includes a protrusion piece 117 and a gliding slot 118. The protrusion piece 117 is disposed in the vicinity of the metallic piece 113. The fixing hook 119 is arranged between the push rod 116 and the indentation 114. A first end of the fixing hook 119 is embedded into the gliding slot 118 of the push rod 116. A second end of the fixing hook 119 is engaged with the indentation 114. Via the fixing hook 119, the push rod 116 is fixed in the indentation 114. The pressing cap 120 is disposed on the tip of the push rod 116 and protruded from the mouse main body 101, so that the pressing cap 120 may be manipulated by a user. Upon actuating the pressing cap 120, the switching mechanism 110 is enabled.

Figure 2:
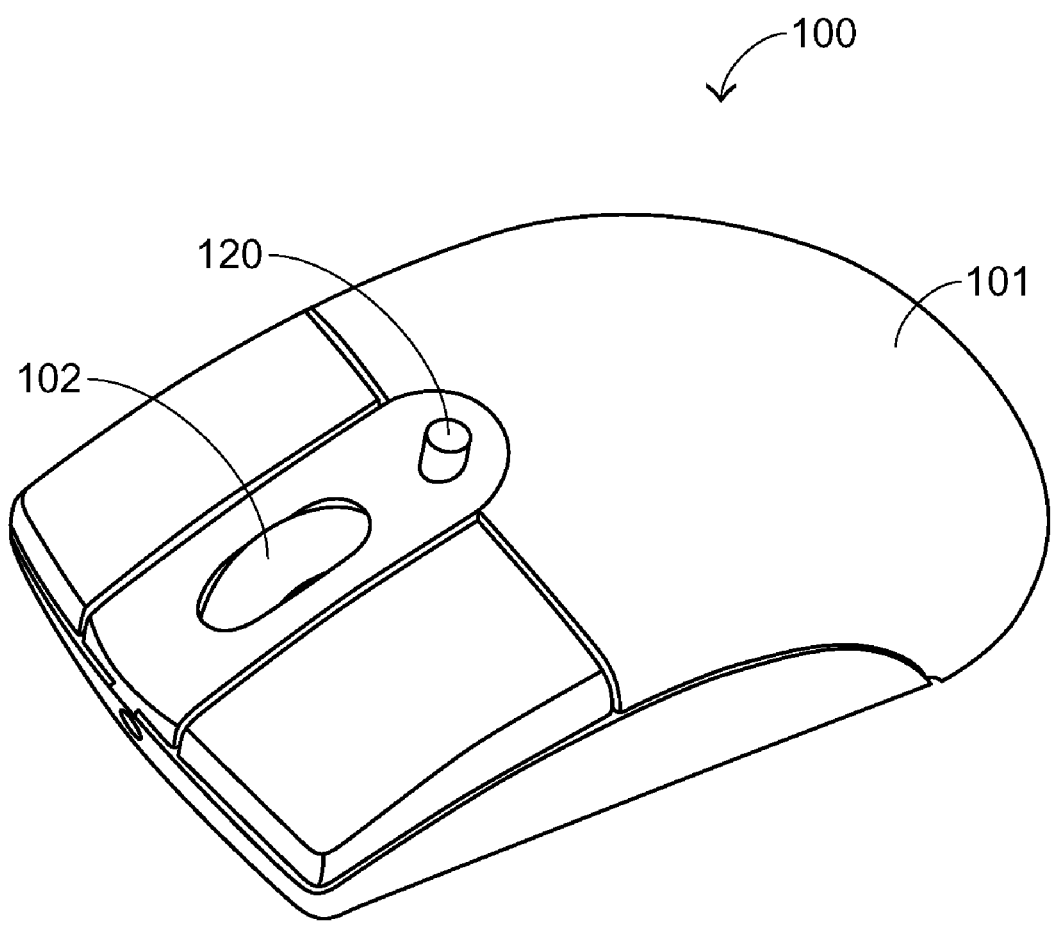
FIG. 2 is a schematic outward view of the mouse device.

A schematic outward view of the mouse device 100 will be illustrated in FIG. 2. As shown in FIG. 2, the roller 102 and the pressing cap 120 are protruded from the mouse main body 101. By selectively pressing down the pressing cap 120, the roller 102 will be operated between a clicking-feel-imparting mode and a clicking-feel-lacking mode.

Figure 3A:
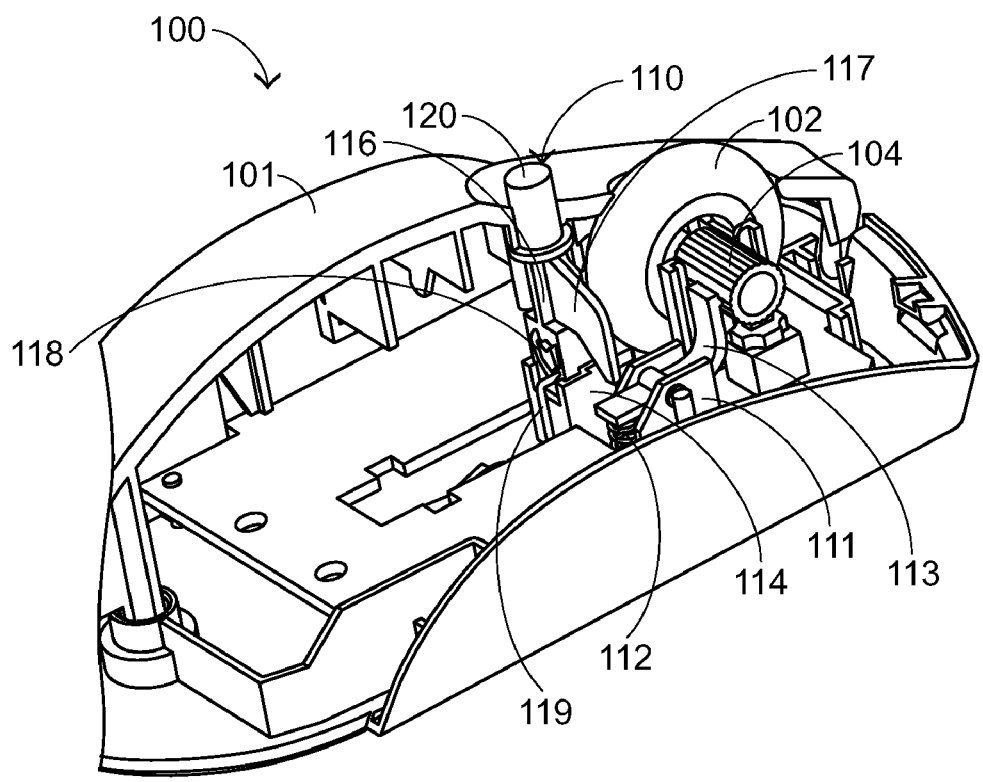
FIG. 3(a) is a schematic partial view illustrating the inner components of the mouse device in a clicking-feel-imparting mode.
Figure 3B:
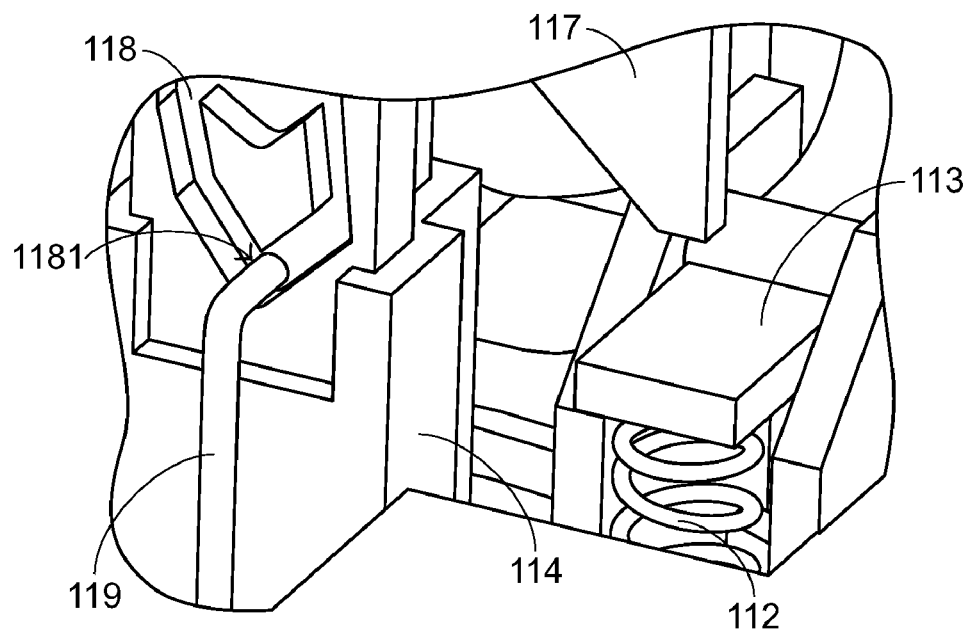
FIG. 3(b) is a partially enlarged view of the mouse device of FIG. 3(a)

Please refer to FIG. 3(a), which is a schematic partial view illustrating the inner components of the mouse device in a clicking-feel-imparting mode. Since the pressing cap 120 has not been pressed down, the push rod 116 is not sustained against the second resilient element 115. Meanwhile, the second resilient element 115 which is received within the indentation 114 is in a stretched state. As shown in the partially enlarged view of FIG. 3(b), the first end of the fixing hook 119 is embedded into the gliding slot 118 at a first position 1181. Please refer to FIG. 3(a) again. Since the second resilient element 115 is in the stretched state, the protrusion piece 117 of the push rod 116 is not sustained against the metallic piece 113, which is supported on the metallic piece stand 111. As a consequence, the first resilient element 112 beside the metallic piece stand 111 is in a stretched state. Since the second terminal of the metallic piece 113 is pushed upwardly by the first resilient element 112, the first terminal of the metallic piece 113 will come into contact with the saw-toothed structures 104 of the rolling shaft 103. When the roller 102 is rotated by the user's finger, the first terminal of the metallic piece 113 is successively contacted with the saw-toothed structures 104 so as to impart the feeling of smooth clicks.

Figure 4A:
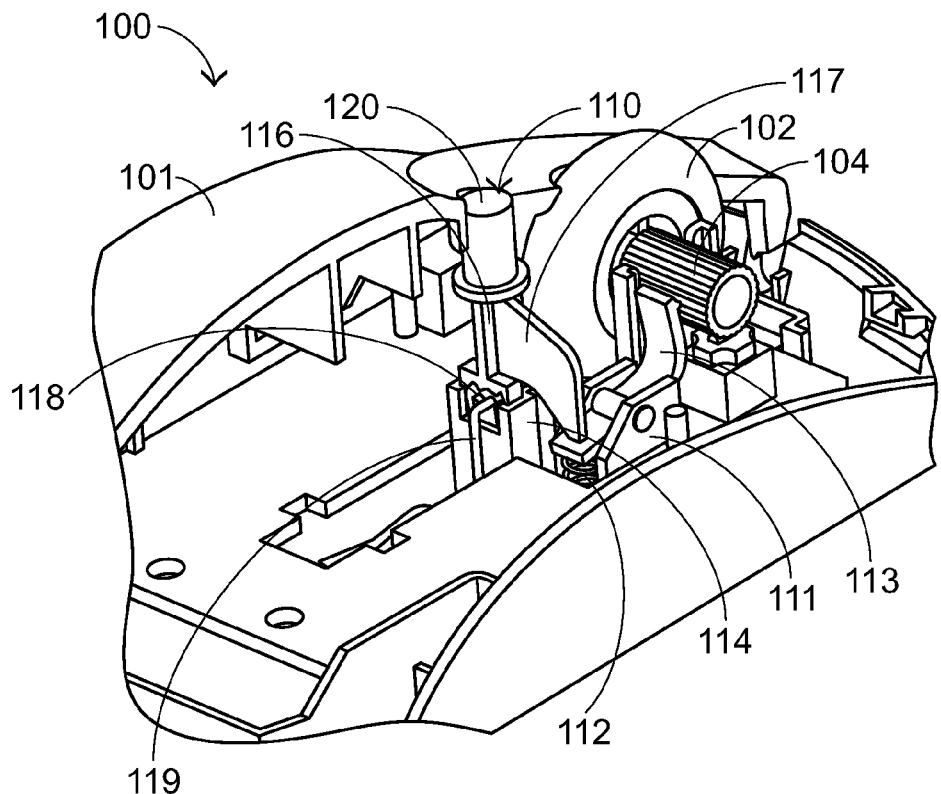
FIG. 4(a) is a schematic partial view illustrating the inner components of the mouse device in a clicking-feel-lacking mode.
Figure 4B:
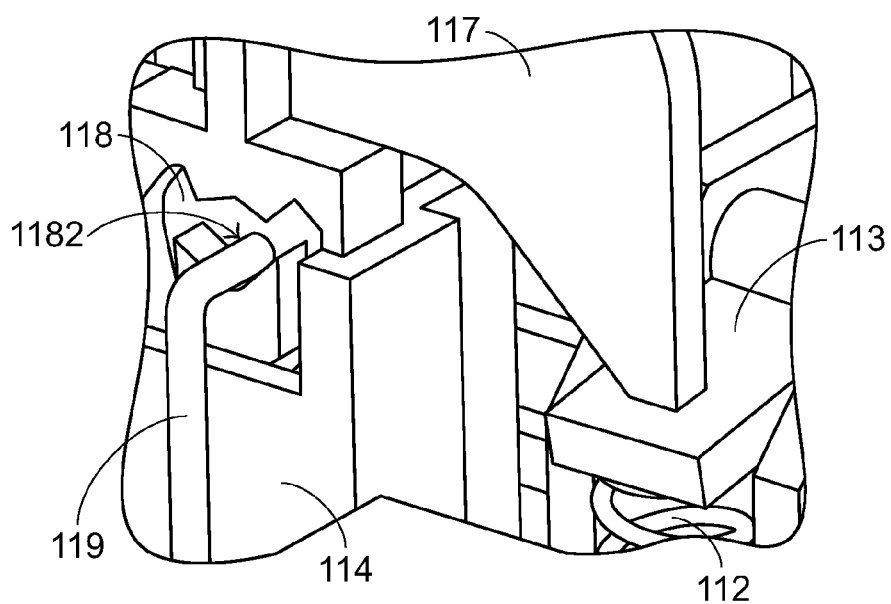
FIG. 4(b) is a partially enlarged view of the mouse device of FIG. 4(a).

Please refer to FIG. 4(a), which is a schematic partial view illustrating the inner components of the mouse device in a clicking-feel-lacking mode. By pressing down the pressing cap 120, the roller 102 is switched to the clicking-feel-lacking mode. Meanwhile, the bottom portion of the push rod 116 partially enters the indentation 114, and is sustained against the second resilient element 115 such that the second resilient element 115 is in a compressed state. As shown in the partially enlarged view of FIG. 4(b), the first end of the fixing hook 119 is embedded into the gliding slot 118 from the first position 1181 to the second position 1182. In this embodiment, since both ends of the fixing hook 119 are fixed in the indentation 114 and the gliding slot 118, the fixing hook 119 is maintained immobile even when the push rod 116 is moved. With downward movement of the push rod 116, the first end of the fixing hook 119 is embedded into the gliding slot 118 from the first position 1181 to the second position 1182. Please refer to FIG. 4(a) again. Since the push rod 116 is moved downwardly, the protrusion piece 117 is descended and sustained against the second terminal of the metallic piece 113 such that the first resilient element 112 is compressed. Meanwhile, the first terminal of the metallic piece 113 is separated from the saw-toothed structures 104. Even when the roller 102 is rotated by the user's finger, the first terminal of the metallic piece 113 will be no longer contacted with the saw-toothed structures 104. Under this circumstance, no click feeling is imparted.

From the above description, the mouse device of the present invention can be operated in a clicking-feel-imparting mode or a clicking-feel-lacking mode according to the user's requirement by using the specific switching mechanism. By selectively contacting/separating the metallic piece with/from the saw-toothed structures, the switching mechanism and the process of imparting click feeling or no click feeling are simply and cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device comprising:

a mouse main body;

a roller disposed within said mouse main body and partially protruded from said mouse main body;

a rolling shaft sheathed by said roller and having plural saw-toothed structures on the periphery thereof; and a switching mechanism disposed within said mouse main body, and including:

a metallic piece stand;

a first resilient element beside said metallic piece stand;

a metallic piece coupled to said metallic piece stand, and having a first terminal adjacent to the saw-toothed structures and a second terminal in contact with said first resilient element;

an indentation receiving therein a second resilient element;

a push rod including a protrusion piece in the vicinity of said metallic piece, a tip protruded from said mouse main body, a bottom portion in contact with said second resilient element and a gliding slot formed at said bottom portion; and a fixing hook having a first end embedded into said gliding slot of said push rod and a second end engaged with said indentation.

2. The mouse device according to claim 1 further comprising a mechanical encoder beside said roller.

3. The mouse device according to claim 1 wherein said metallic piece comes to contact with said saw-toothed structures when said first resilient element is in a stretched state, and said metallic piece is separated from said saw-toothed structures when said first resilient element is in a compressed state.

4. The mouse device according to claim 3 wherein said first resilient element is in said compressed state when said protrusion piece is sustained against said metallic piece, and said first resilient element is in said stretched state when said protrusion piece is separated from said metallic piece.

5. The mouse device according to claim 4 wherein said protrusion piece is sustained against said metallic piece and said first end of said fixing hook is embedded into said gliding slot at a second position when said second resilient element is in said compressed state, and said protrusion piece is separated from said metallic piece and said first end of said fixing hook is embedded into said gliding slot at a first position when said second resilient element is in said stretched state.

6. The mouse device according to claim 1 further comprising a pressing cap formed at said tip of said push rod and protruded from said mouse main body.

* * * * *

UNITED STATES PATENT AND TRADEMARK OFFICE
CERTIFICATE OF CORRECTION

PATENT NO. : 7,667,689 B2 Page 1 of 1
APPLICATION NO. : 11/673408
DATED : February 23, 2010
INVENTOR(S) : Cheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this

Seventh Day of December, 2010

David J. Kappos
*Director of the United States Patent and Trademark Office*